(12) United States Patent
Zhan et al.

(10) Patent No.: US 8,783,168 B2
(45) Date of Patent: Jul. 22, 2014

(54) DOUBLE-LAYER GRILLING DEVICE

(75) Inventors: Yixin Zhan, Zhangzhou (CN);
Hongshan Huang, Zhangzhou (CN)

(73) Assignee: Tsann Kuen (Zhangzhou) Enterprise Co., Ltd., Zhangzhou, Fujian (CN)

( * ) Notice: Subject to any disclaimer, the term of this patent is extended or adjusted under 35 U.S.C. 154(b) by 127 days.

(21) Appl. No.: 13/309,795

(22) Filed: Dec. 2, 2011

(65) Prior Publication Data
US 2012/0137896 A1 Jun. 7, 2012

(30) Foreign Application Priority Data

Dec. 2, 2010 (CN) .................... 2010 2 0640960 U

(51) Int. Cl.
*A47J 37/06* (2006.01)

(52) U.S. Cl.
CPC .................... *A47J 37/0611* (2013.01)
USPC .......................................... 99/374

(58) Field of Classification Search
USPC .............. 99/372–380; 219/448.11–448.19, 219/509–515, 524
See application file for complete search history.

(56) References Cited

U.S. PATENT DOCUMENTS

2004/0123744 A1* 7/2004 Bobo ............................. 99/374
2007/0017384 A1* 1/2007 Serra ............................. 99/372

* cited by examiner

*Primary Examiner* — Henry Yuen
*Assistant Examiner* — Brandon Harvey
(74) *Attorney, Agent, or Firm* — Rabin & Berdo, P.C.

(57) ABSTRACT

A double-layer rotatable grilling device has a base with two supporting brackets; a pan component rotatably disposed between the two supporting brackets, which has a lower pan unit with a cooking surface on the top, and a lower handle on one end; an upper pan unit with a cooking surface on the bottom, and an upper handle on one end; and a middle pan unit with two cooking surfaces both on the top and the bottom, and a temperature controller for adjusting the pans units disposed on the middle pan unit, and the knob for adjusting the temperature controller. The temperature controller is a mechanical controller with double-metal pieces, and the temperature is adjusted by rotating the bronze axle; a rotating shaft is disposed between the knob and the temperature controller, the knob can rotate the rotating shaft, and then the bronze axle of the temperature controller can be rotated.

8 Claims, 3 Drawing Sheets

DOUBLE-LAYER GRILLING DEVICE

FIELD OF THE INVENTION

The present invention relates to a grilling device, more particularly, to a double-layer grilling device with mechanical temperature control.

BACKGROUND OF THE INVENTION

Generally, the grilling device in the market has two ways in heating: one is heated by electric tubes, and the other is by gas. The grilling device heated by gas has fast heating speed, but the temperature control is not easy; while the grilling device heated by electric tube has relatively low heating speed, but the temperature control is easy.

Rotatable electric-heating grilling device can be divided into two types: single-layer rotatable grilling device and double-layer rotatable grilling device. the single-layer grilling device comprises a base and a pan component, the base has two supporting brackets, and the pan component rotatably disposed between the two supporting brackets. The pan component comprises a lower pan unit and an upper pan unit, the room between the two units is for cooking food, because only has one cooking layer, the food can be cooked on one time is relatively less; the double-layer rotatable grilling device comprises a base with two supporting brackets; a pan component rotatably disposed between the two supporting brackets, the pan component comprises a lower pan unit with a cooking surface on the top; an upper pan unit with a cooking surface on the bottom; and a middle pan unit with two cooking surfaces both on the top and the bottom, because it has two cooking rooms, food can be cooked in two layers each time, so more food can be cooked each time.

But the double layer grilling device has the following disadvantages: firstly, the temperature can not be adjusted according to cooking, requirements, secondly, the pans may be opened by the expanded food after being heated, thus affecting the cooking effect.

SUMMARY OF THE INVENTION

The primary object of the present invention is to provide a double-layer grilling device which temperature can be adjusted, thus to obviate the disadvantages that the temperature can not be adjusted in background.

Another object of the present invention is to provide a double-layer grilling device which pan unit can be locked, thus to obviate the disadvantages that the pans may be opened by the expanded food after being heated in background.

These and other objects are achieved by providing:
a double-layer rotatable grilling device comprises
a base with two supporting brackets;
a pan component rotatably disposed between the two supporting brackets, comprises,
  a lower pan unit with a cooking surface on the top, and a lower handle on one end;
  an upper pan unit with a cooking surface on the bottom, and a upper handle on one end; and
  a middle pan unit with two cooking surfaces both on the top and the bottom, and a temperature controller for adjusting the pans units disposed on the middle pan unit, and the knob for adjusting the temperature controller.
wherein the temperature controller is a mechanical temperature controller with double-metal pieces, and the temperature adjusting is by rotating the bronze axle; a rotating shaft is disposed between the knob and the temperature controller, by rotate the knob, the rotating shaft can be rotated, and then the bronze axle of the temperature controller can be rotated, thus the temperature of temperature controller with double-metal pieces is adjusted and the pan temperature is adjusted.

In a preferred embodiment of the present invention, said knob has a loose position and a lock position, in said lock position, the upper handle and the lower handle can be locked by the knob, in said loose position, the upper handle and the lower handle is loose from the knob.

In a preferred embodiment of the present invention, said knob is disposed on the end with handle of the middle pan unit, and the temperature controller is disposed on the opposite end.

In a preferred embodiment of the present invention, the knob is cap-shaped with an opening in one end, a rotating sleeve rotated synchronously to the knob is disposed inside the knob, said middle pan unit has a handle portion which is sleeve outside the rotating sleeve and inside the inner wall of the knob, said handle portion has a cavity.

In a preferred embodiment of the present invention, the upper pan unit has an upper handle, said upper handle comprises a shank and an annular grip, an upper flange which can be sleeved into the cavity of the middle pan unit is extended from the shank to the inside of the grip.

In a preferred embodiment of the present invention, the lower pan unit has an lower handle, said lower handle comprises a shank and an annular grip, an lower flange which can be sleeved into the cavity of the middle pan unit is extended from the shank to the inside of the grip.

In a preferred embodiment of the present invention, said knob sleeved at least a portion of the outside of the upper flange or the lower flange in the cavity of handle portion of the middle pan unit.

In a preferred embodiment of the present invention, in the two supporting brackets, the right supporting bracket has a pivot hole, the left supporting bracket has a pivot groove with an opening towards up; the right side of said middle pan unit has a pivot portion, and a rotating shaft is disposed on the pivot portion, said rotating shaft is pivotally connected in the pivoting hole, the handle of the upper pan unit or the lower pan unit is rest on the pivot groove of the left supporting bracket.

In a preferred embodiment of the present invention, the right end of the upper pan unit is pivotally connected to the upper portion of the pivot portion of the middle pan unit; the lower pan unit is pivotally connected to the lower portion of the pivot portion of the middle pan unit.

In a preferred embodiment of the present invention, each of the upper pan unit, middle pan unit and the lower pan unit has electric heating tube for heating the pans.

Advantages: the double-layer grilling device of the present invention has a mechanical temperature controller, thus the temperature can be adjusted according to different requirements in cooking, and the mechanical temperature controller has lower price relative to similar electric temperature controller; and the knob has locking function, the upper pan and the lower pan can be cooked in cooking, thus avoid that the pans may be opened by the expanded food after being heated, then affect the cooking effect. the structure of the present invention is simple and lower-cost.

DETAILED DESCRIPTION OF PREFERRED EMBODIMENTS

Figure 1:
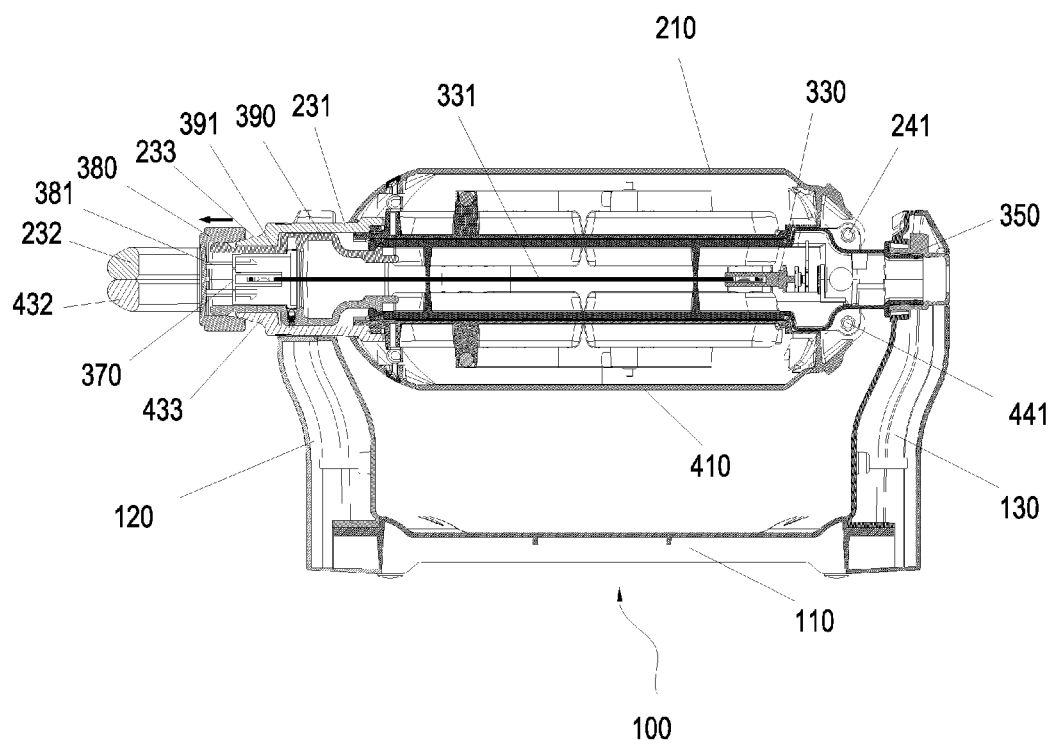
FIG. 1 is a sectional view of the double-layer grilling device of the present invention.
Figure 2:
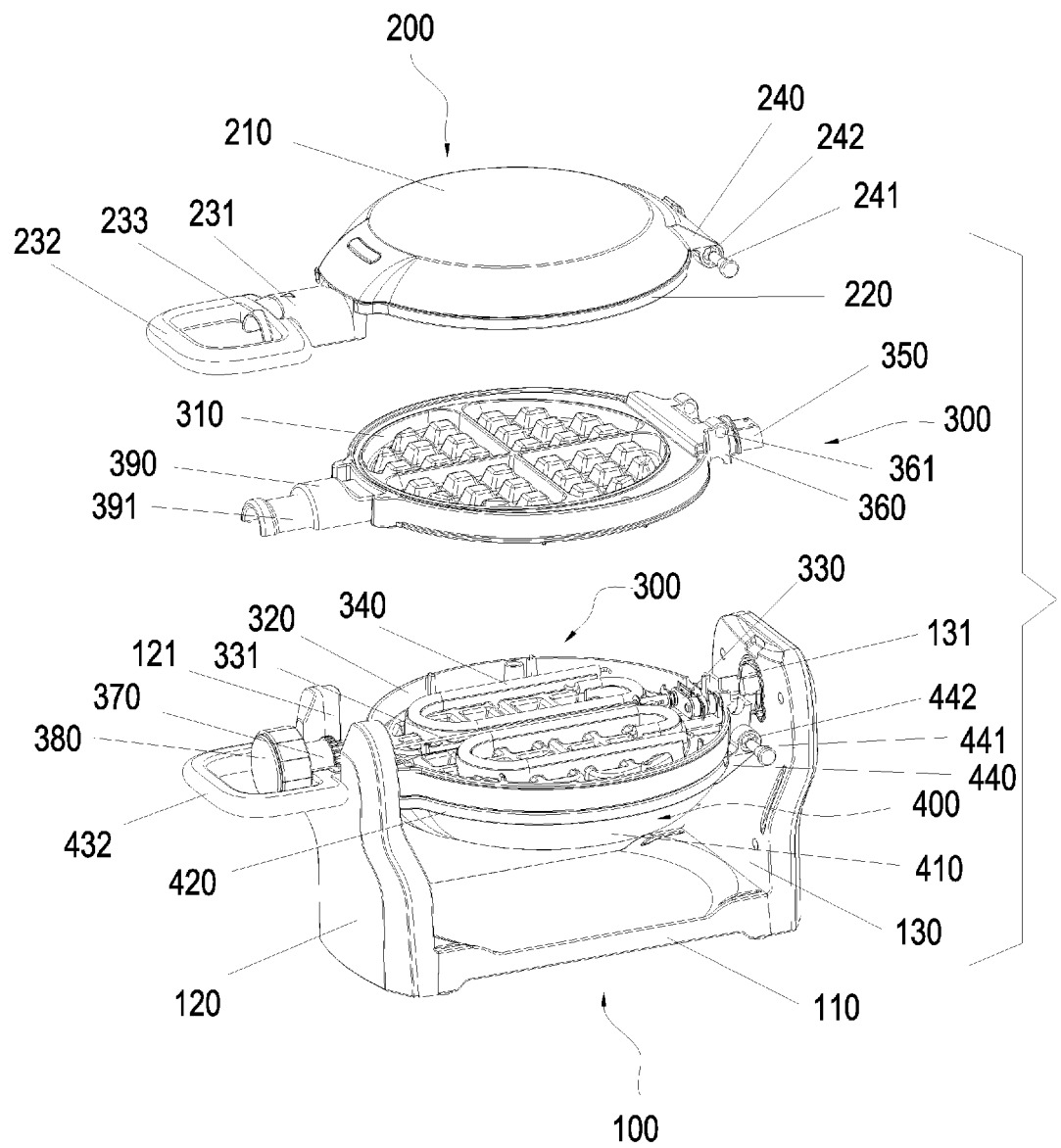
FIG. 2 is an exploded view of the double-layer grilling device of the present invention.

Referring to FIG. 1 and FIG. 2, the double-layer grilling device comprises a base 100 and a pan component, the pan component comprises an upper pan unit 200, a middle pan unit 300 and a lower pan unit 400.

The base 100 comprises a bottom plate 110 and a left supporting bracket 120 and a right supporting bracket 130 disposed on the left end and right end of the bottom plate 110 respectively, the right supporting bracket 130 has a pivot hole 131, and the left supporting bracket 120 has a pivot groove 121 with an opening towards up.

The upper pan unit 200 comprises an upper shell 210 and a pan 220, heating tubes (not shown) for heating the pan 220 are embedded inside the shell 210. An upper handle is disposed on the left end of the upper shell 210, the upper handle comprises a shank 231 and an annular grip 232, the shank 231 is a hollow half-cylinder and an upper flange 233 is extended from the shank 231 to the inside of the grip 232, a pivot portion 240 is disposed on the right side of the upper shell 210, a pivot hole 242 and a shaft 241 is disposed on the pivot portion 240.

The lower pan unit 400 is similar to the upper pan unit 200, and comprises a lower shell 410 and a lower pan 420, heating tubes (not shown) for heating the pan 420 are embedded inside the shell 410. A lower handle is disposed on the left end of the lower shell 410, the lower handle comprises a shank and an annular grip 432, the shank is a hollow half-cylinder and a lower flange 433 is extended from the shank to the inside of the grip 432, a pivot portion 440 is disposed on the right side of the lower shell 410, a pivot hole 442 and a shaft 441 is disposed on the pivot portion 440.

The middle pan unit 300 comprises an upper portion 310 and a cooperated lower portion 320, the top surface of the upper portion 310 is the cooking surface, and the bottom of the lower portion 320 is the cooking surface. Electric heating tube 340 for heating the cooking surfaces is embedded inside the lower portion. A pivot portion 360 for pivotally connecting the upper pan and lower pan is disposed on the end which has the pivotal hole 131, the pivot portion 360 has pivotal holes 361 for pivotally connecting the upper pan and pivotal holes (not shown) for pivotally connecting the lower pan, a right shaft 350 (protrusion) which can insert into the pivotal hole 131 is extended out from the pivot portion 360. A mechanical adjustable temperature controller 330 is disposed inside the lower portion 320, and near to the end which has the pivot 360, the mechanical temperature controller 330 is a double-metal pieces mechanical temperature controller 330, and the temperature adjusting is by rotating the bronze axle; a rotating shaft 331 for adjust the temperature is connected to the bronze axle, the rotating shaft 331 is cross the inside of the lower portion 320, and its left end is inserted into the rotating sleeve 370, the other end of the rotating sleeve 370 is sleeved into a knob 380.

The knob 380 is cap-shaped, several claws 381 are extended through the rotating sleeve 370 from the bottom of the inside of the knob 380, thus, the knob 380 and the rotating sleeve 370 can be synchronously rotated and about an axis then the rotating shaft 331 can be rotated. The handle portion 390 of the middle pan is sleeve on the outside of the rotating sleeve 370, a groove 391 is disposed around the surface of the handle portion 390, the upper flange 233 and the lower flange 433 are inserted into the groove 391. The knob 380 has a loose (released) position and a locked position, in lock position, a part of the upper flange 233 and the lower flange 433 which are in the groove of the handle portion of the middle pan unit are inserted in the knob, thus the upper pan unit and the lower pan unit are locked together, as is shown in FIG. 1; in loose position, the knob move to left direction, then the upper flange 233 and the lower flange 433 are free, and the upper pan unit and the lower pan unit can be opened.

When food is placed on the pans, close the upper shell and the lower shell, then move the knob to right direction to clamp the upper flange 233 and the lower flange 433, after the food is cooked, move the knob axially to the left direction, and open the upper shell, then the food can be taken out. Rotate the pan unit for 180 degree, then the lower shell is return to the up, and the lower shell can be opened. In cooking, users can return the knob to adjust the temperature controller according to different food or taste, thus the food can be cooked in different temperature.

Figure 3:
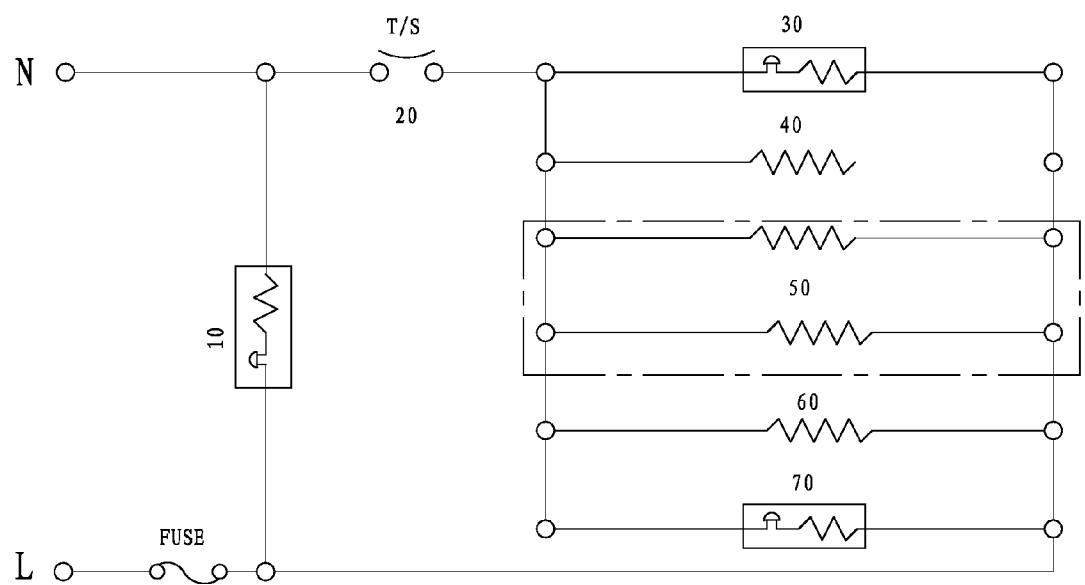
FIG. 3 is circuit diagram of the present invention.

The circuit diagram of the present invention is shown in FIG. 3, it comprises a power lamp 10, a switch 20, and a lamp 30, a lamp 70, an electric heating circuit 40 for upper pan, an electric heating circuit 50 for middle pan and an electric heating circuit 60 for lower pan installed in parallel. The circuit diagram is known in the art.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with detailed description, but rather by the claims appended hereto.

What is claimed is:

1. A double-layer grilling device, comprising:
   a base with two supporting brackets;
   a pan component rotatably disposed between the two supporting brackets, comprising:
   a lower pan unit with a first cooking surface on a top thereof, and a lower handle on one end thereof, the lower handle having a lower flange;
   an upper pan unit with a second cooking surface on a bottom thereof, and an upper handle on one end thereof, the upper handle having an upper flange; and
   a middle pan unit with two cooking surfaces, one on a top thereof and another on a bottom thereof, the middle pan unit further having a groove that accommodates the upper flange and the lower flange therein,
   a double-metal pieces mechanical temperature controller for adjusting a temperature of the respective pan units and being disposed in the middle pan unit, and comprising a rotatable bronze axle;
   a knob that is rotatable about an axis, and is linearly movable along the axis to a locked position and to a released position, and
   a rotating shaft disposed between and connected to said knob and said bronze axle,
   wherein when said knob is in the locked position and rotated about the axis, said rotating shaft and said bronze axle are caused to rotate, to thereby adjust said temperature controller and change the temperature of said pan component, wherein when said knob is in the locked position, the knob is sleeved over the groove and the upper and lower flanges, to lock the lower pan unit, upper pan unit and middle pan unit together, and wherein when said knob is in the released position, the knob moves away from the groove and the upper and lower flanges, to allow the lower pan unit and upper pan unit to be moved away from the middle pan unit.

2. The double-layer grilling device according to claim 1, wherein said knob is disposed on an end of the middle pan unit in a region of the groove, and the temperature controller is disposed on an opposite end of the middle pan unit.

3. The double-layer grilling device according to claim 2, wherein the knob has a cap with an opening in one end thereof, and has a rotating sleeve that is rotated synchronously to the cap and is disposed inside the cap, said middle pan unit has a handle portion which is sleeved outside the rotating sleeve and inside an inner wall of the cap, the groove being disposed on said handle portion.

4. The double-layer grilling device according to claim 3, wherein the upper handle comprises a shank and an annular grip, the upper flange extending from the shank to an inside of the grip.

5. The double-layer grilling device according to claim 3, wherein the lower handle comprises a shank and an annular grip, the lower flange extending from the shank to an inside of the grip.

6. The double-layer grilling device according to claim 1, wherein the two supporting brackets include a right supporting bracket and a left supporting bracket, the right supporting bracket having a pivot hole, the left supporting bracket having a pivot groove with an opening facing up; a right side of said middle pan unit having a pivot portion, and a rotating protrusion disposed on the pivot portion, said rotating protrusion being pivotally connected in the pivot hole, one of the upper handle and the lower handle resting on the pivot groove of the left supporting bracket.

7. The double-layer grilling device according to claim 6, wherein a right end of the upper pan unit is pivotally connected to an upper portion of the pivot portion of the middle pan unit; and the lower pan unit is pivotally connected to a lower portion of the pivot portion of the middle pan unit.

8. The double-layer grilling device according to claim 1, wherein each of the upper pan unit, middle pan unit and the lower pan unit has an electric heating tube for heating the pans.

\* \* \* \* \*